US006348021B1

(12) United States Patent
Lemanski

(10) Patent No.: US 6,348,021 B1
(45) Date of Patent: Feb. 19, 2002

(54) VARIABLE SPEED POWER TRANSMISSION

(76) Inventor: Alphonse J. Lemanski, #1 Kimberly Dr., Huntington, CT (US) 06484

(*) Notice: Subject to any disclaimer, the term of this patent is extended or adjusted under 35 U.S.C. 154(b) by 0 days.

(21) Appl. No.: 09/736,869

(22) Filed: Dec. 14, 2000

Related U.S. Application Data

(60) Provisional application No. 60/170,785, filed on Dec. 15, 1999.

(51) Int. Cl.[7] .................... F16H 23/10

(52) U.S. Cl. .................... 475/164; 475/169; 475/171

(58) Field of Search .................... 475/163, 164, 475/169, 171, 1, 3, 4, 5

(56) References Cited

U.S. PATENT DOCUMENTS 655,697 A * 8/1900 Dunn .................... 475/164
1,748,907 A 2/1930 Vallance
1,881,931 A * 10/1932 Powell .................... 475/169
2,144,110 A * 1/1939 Herrick .................... 475/169
2,699,690 A * 1/1955 Kobler .................... 475/164
2,785,590 A * 3/1957 Sundt .................... 475/169
2,953,944 A * 9/1960 Sundt .................... 475/169
3,139,771 A * 7/1964 Maroth .................... 475/164
3,590,659 A 7/1971 Maroth
3,722,322 A * 3/1973 Coeppert .................... 475/171
3,895,540 A * 7/1975 Davidson .................... 475/164
4,620,457 A 11/1986 Distin et al.
4,966,573 A * 10/1990 Yokoi .................... 475/164

FOREIGN PATENT DOCUMENTS

GB 2117474 * 10/1983 .................... 475/164

* cited by examiner

*Primary Examiner*—Sherry Estremsky
(74) *Attorney, Agent, or Firm*—Perman & Green, LLP

(57) ABSTRACT

A continuously variable speed power transmission includes a rotatable input member, a rotatable output member including a plurality of rearwardly directed output face cams. A reaction control rotor selectively rotatable about the input axis includes a plurality of forwardly directed reaction face cams opposed to the output face cams. A pericyclic motion converter rotatably mounted for nutational motion about the input axis includes a plurality of load transmitting follower members simultaneously engageable with the output face cams and with the reaction face cams. A control mechanism selectively adjusts the rotational rate of the reaction control rotor relative to the input member such that relative rotation between the reaction control rotor and the input member results in both rotation and nutation of the pericyclic motion converter about the input axis resulting in a continuously variable change of ratio of the rotational speed of the output member relative to the input member.

20 Claims, 13 Drawing Sheets

6
7
2
5
9
3
4

18
20
14b
15a
17
11
23
21
19
22
28
14a
13
16a
16b
15b
12
10

14b
30b
17
28a
14a
28b
30a 204
206
212
220
222
230
234
236
238
240
242
244
246
248
250
252
254
204a
212a
220a
222a
230a
234a
238a
242a
244a
246a
248a
250a
252a
252b
254a
254b 208a
214a
210a
212a
220a
244a
252a
250a
254a
246a
242a
234a
204a
200a
222a
230a
CPU
202a
256a
206a
204a

VARIABLE SPEED POWER TRANSMISSION

The present application is related to now abandoned Provisional Application Serial No. 60/170,785 of Alphonse J. Lemanski, filed Dec. 15, 1999, entitled "Variable Speed Power Transmission", based on which priority is herewith claimed under 35 U.S.C. §119(e) and the disclosure of which is incorporated herein by reference in its entirety.

BACKGROUND OF THE INVENTION

1. Field of the Invention

The present invention relates to power transmission systems and, more particularly, to such systems which are of the all rolling, positive contacting, variable speed type and, still more particularly, wherein extensive load sharing occurs among the load transmitting members.

2. Prior Art

The present invention relates to a transmission system which incorporates oscillator members. It is known in the art to use a wobbling member known as a nutator to effect a fixed gear reduction or speed reduction/increase in a transmission system. Generally representative of the pertinent prior art as it pertains to the present invention are a trio of U.S. Patents, namely, U.S. Pat. No. 4,620,457 to Distin et al., U.S. Pat. No. 3,590,659 to Maroth, and U.S. Pat No. 1,748,907 to Vallance.

U.S. Pat. No. 4,620,457 to Distin et al. discloses a torque transmitting gearing system of the nutating type equipped with a nutating idler member which is in torque transmitting engagement with both a stator and an output gear. Torque transmission between the respective elements is achieved via respective series of rolling, torque transmitting elements in the form of tapered rollers. The rollers are maintained in substantially continuous contact with both their respective driving and driven raceway surfaces, which are formed with trochoidal curvature. Within a given pair of coacting gear surfaces, one surface is shaped with epitrochoidal curvature, and the other with hypotrochoidal curvature.

U.S. Pat. No. 3,590,659 to Maroth discloses a speed changer apparatus with a nutating member having force transfer members in the form of roller elements which nutatively contact inclined surfaces on an action member coupled to an output shaft. The nutating member is prevented from rotation by stationary mounted inclined surfaces which are contacted by force transfer members/The nutating member is peripherally engaged by a rotating driving member coupled to a rotating input shaft. The driving member is provided with a surface shaped to impart nutative motion to the nutating member. Superior axial balance is obtained by operating a pair of nutating sections with opposing axial motions with respect to each other.

U.S. Pat. No. 1,748,907 to Vallance discloses apparatus for transmitting rotary motion from one rotatable element to another rotatable element using a plate, ring, or similar component connected to the rotatable elements using such a construction that rotation of one of the elements causes the plate, ring, or similar component to tilt or oscillate in such a manner that every point in its circumference moves in a lemniscate path and effects rotation of the other one of the elements at an invariable reduced speed or at an invariable increased speed. In greater detail, the Vallance patent discloses a speed reduction mechanism in the form of a nutating gear system, wherein an input shaft initiates wobbling motion of an intermediate member 7, via the engagement of a portion 9*b* of the intermediate member with an angled or canted portion of the input shaft 2. Radially outwardly on the member 7 are disposed a train of teeth 10 which engage stator teeth 11 formed on a portion of the stationary housing 5. Inside of the cup-member 7 are arranged a number of hemispherical recesses 7*b*, in which are fixedly seated a like number of balls 8. These balls are in turn in engagement with a continuous curved groove 6*b* formed in an output member 6. As with other known nutating systems, the engagement between stator teeth 10, 11 prevents the intermediate member 7 from rotating during nutation, so that output rotation is effected solely by means of the engagement between the fixed balls and the groove. As the idler member 7 nutates, the balls 8 successively cam the element 6 rotationally by engaging the walls of the curved groove.

It was with knowledge of the foregoing state of the technology that the present invention has been conceived and is now reduced to practice.

SUMMARY OF THE INVENTION

The present invention discloses, in one embodiment, a continuously variable speed power transmission includes a rotatable input member, a rotatable output member including a plurality of rearwardly directed output face cams thereon. A reaction control rotor mounted for selective rotation about the input axis includes a plurality of forwardly directed reaction face cams thereon in opposition to the output face cams on the output member. A pericyclic motion converter rotatably mounted for nutational motion about the input axis includes a plurality of load transmitting follower members thereon simultaneously engageable with the output face cams and with the reaction face cams. A control mechanism selectively adjusts the rate of rotation of the reaction control rotor relative to the input member such that relative rotation between the reaction control rotor and the input member results in both rotation and nutation of the pericyclic motion converter about the input axis and thereby results in a continuously variable change of ratio of the rotational speed of the output member relative to the input member. In another embodiment, the pericyclic motion converter is rotatably mounted on an encompassing housing. In either event, the load transmitting members of the pericyclic motion converter kinematically under pure rolling contact traverse a mathematically higher order spherical path of action during each revolution of the input member.

The present invention is an all rolling positive contacting mechanical variable speed, power transmission system. It utilizes the fundamental principles of high load capacity and torque transmission efficiency facilitated by high precision rolling element bearings. The concentrated rolling surface contact conditions that prevail in the present invention during torque transmission also facilitates its operation with minimal fluid lubricant. The unique design of conjugate load bearing surfaces in the present invention permits the use of tribologically robust materials and surface film transfer conditions to take place in the concentrated roller contacts. All other known mechanical power transmission systems that employ nutation and various types of gearing arrangements, balls and rollers which engage face cam tooth type surfaces do not possess the unique concentrated rolling conjugate surface contact conditions that are incorporated in the present invention. The present invention is thereby capable of much higher torque density and power transmission efficiency than other known continuously variable mechanical power transmission systems.

The transmission of the invention can be employed in many devices and includes an input member, reaction members driven by the input member, a pericyclic member or oscillator member driven by the input member and a drive output member driven by the pericyclic member, in which the rotation speed of the reaction member and or the pericyclic member can be controlled independent of the input member: thereby, allowing the speed reduction/increase at the output drive member to vary. More specifically, the invention is an all rolling positive contacting mechanical variable speed, power transmission system. It utilizes the fundamental principles of high load capacity and torque transmission efficiency of high precision rolling element bearings. The concentrated rolling surface contact conditions that prevail in the present invention during torque transmission facilitates its operation with minimal fluid lubricant. The unique design of conjugate load bearing surfaces in the present invention permits the use of tribologically robust materials and surface film transfer conditions to take place in the concentrated roller contacts. All other mechanical power transmission systems that employ various types of gearing arrangements, balls or rollers which engage face cam tooth type surfaces do not possess the unique concentrated rolling conjugate surface contact condition that is incorporated in the present invention. The present invention is thereby capable of higher torque density and power transmission efficiency than other mechanical power transmission systems.

A primary feature, then, of the present invention is the provision of a variable speed power transmission which not only produces a certain gear reduction or speed reduction/increase in a transmission using such an oscillator member but which operates to vary the gear reduction or speed reduction/increase in the transmission.

Another feature of the present invention is the provision of such a transmission which results in a continuously variable change of ratio of the rotational speed of the output member relative to the input member.

Yet another feature of the present invention is the provision of such a power transmission which includes an input member rotatable about an input axis, an output member rotatable about an output axis including a plurality of rearwardly directed output face cams thereon, a reaction control rotor mounted for selective rotation about the input axis including a plurality of forwardly directed reaction face cams thereon in opposition to the output face cams on the output member, a pericyclic motion converter rotatably mounted for nutational motion about the input axis including a plurality of load transmitting follower members thereon simultaneously engageable with the output face cams and with the reaction face cams, and an active control device for selectively adjusting the rate of rotation of the reaction control rotor relative to the input member whereby relative rotation between the reaction control rotor and the input member results in both rotation and nutation of the pericyclic motion converter about the input axis and thereby results in a continuously variable change of ratio of the rotational speed of the output member relative to the input member.

Still another feature of the present invention is the provision of such a power transmission in which the output face cams, the reaction face cams, and the follower members of the pericyclic motion converter all employ bevel type gear teeth including internal bevel type gear teeth having a pitch angle greater than 90°.

Yet a further feature of the present invention is the provision of such a transmission having the construction of the pericyclic motion converter being rotatably mounted on an encompassing housing.

Still another feature of the present invention is the provision of such a transmission in which the load transmitting members of the pericyclic motion converter kinematically under pure rolling contact traverse a mathematically higher order spherical path of action during each revolution of the input member.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
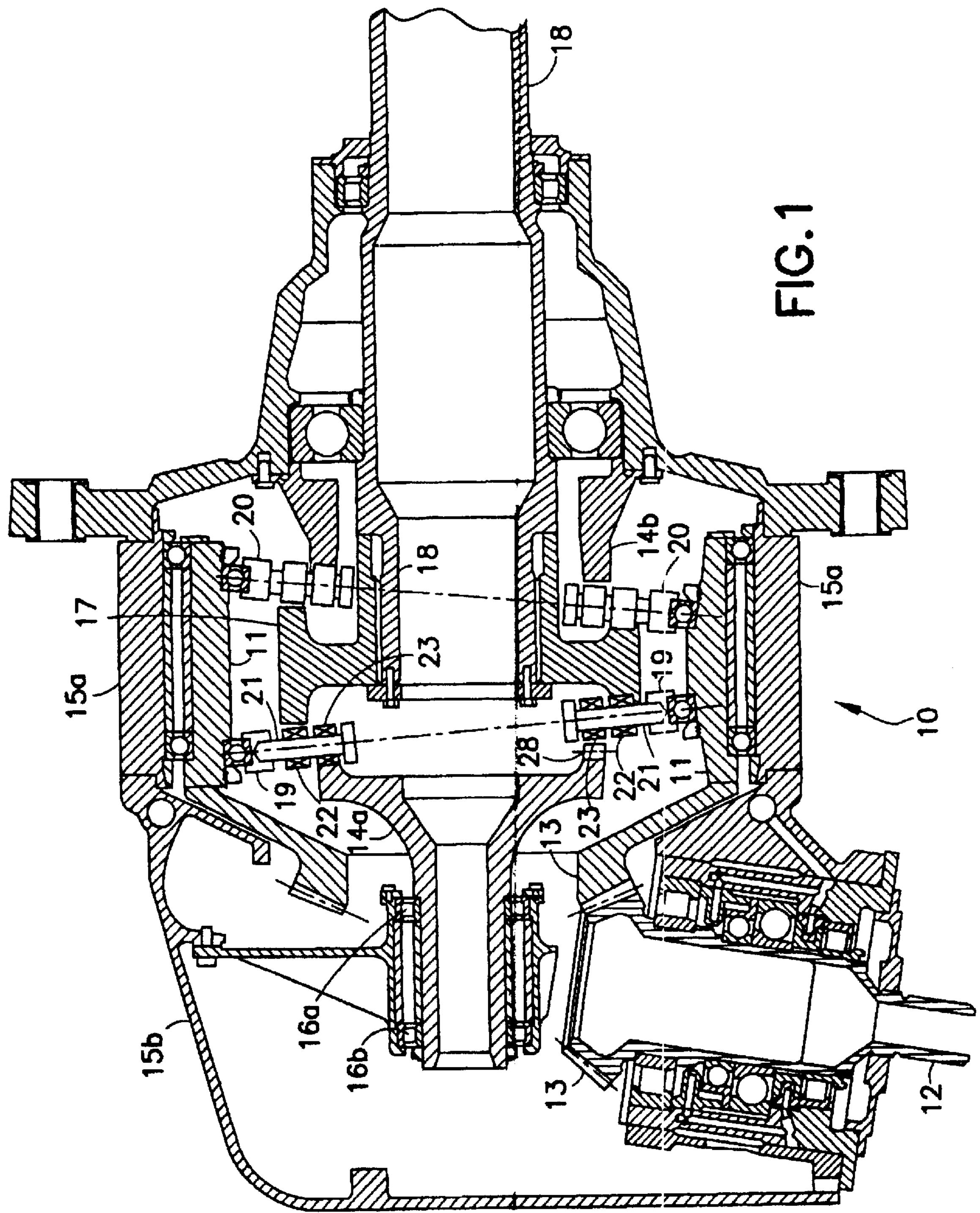
FIG. 1 is a side elevation view, in section, of one embodiment of the continuously variable power transmission of the present invention.
Figure 2:
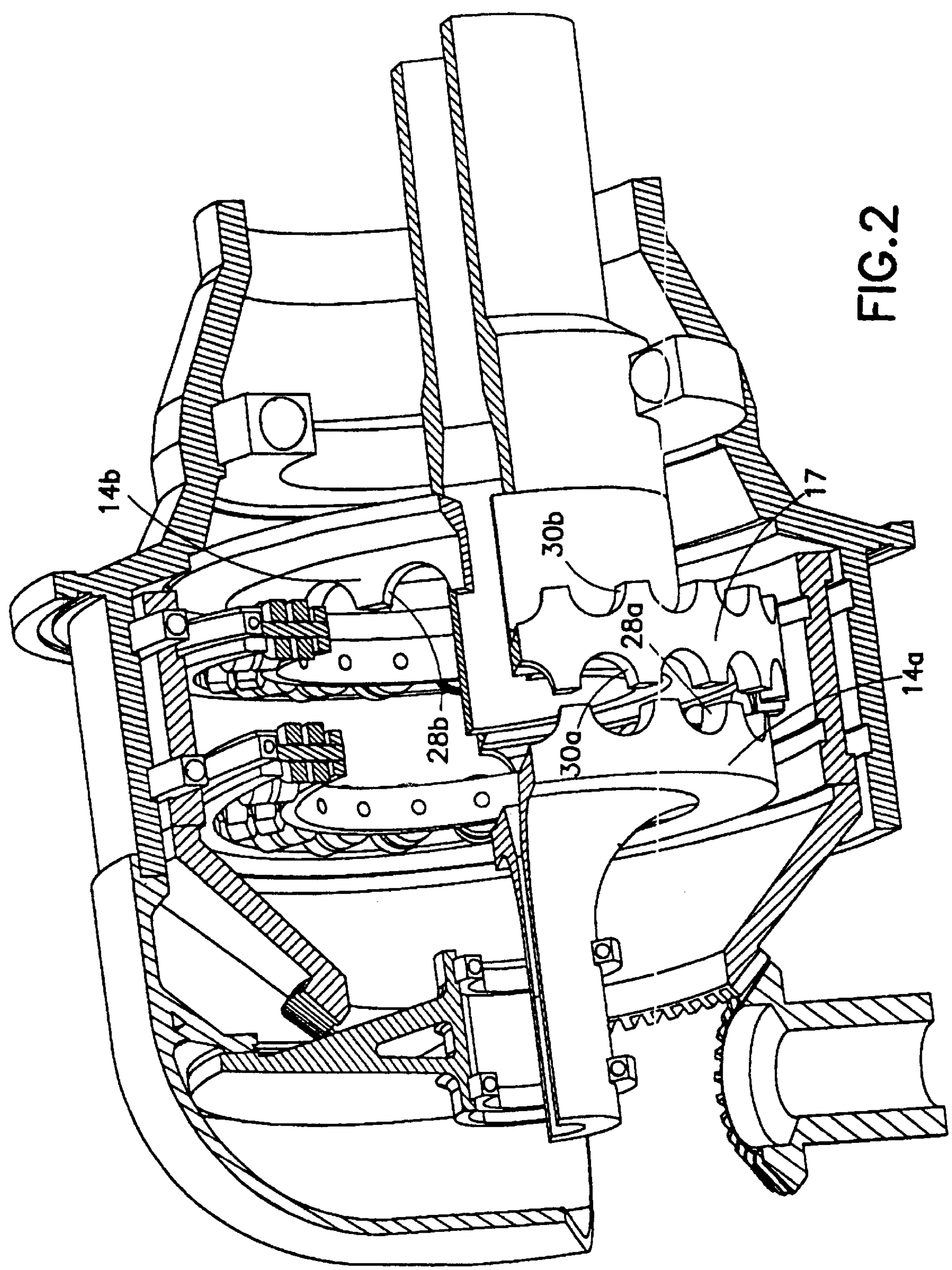
FIG. 2 is a perspective view, largely cut away and in section, illustrating the internal components of the power transmission illustrated in FIG. 1.
Figure 3:
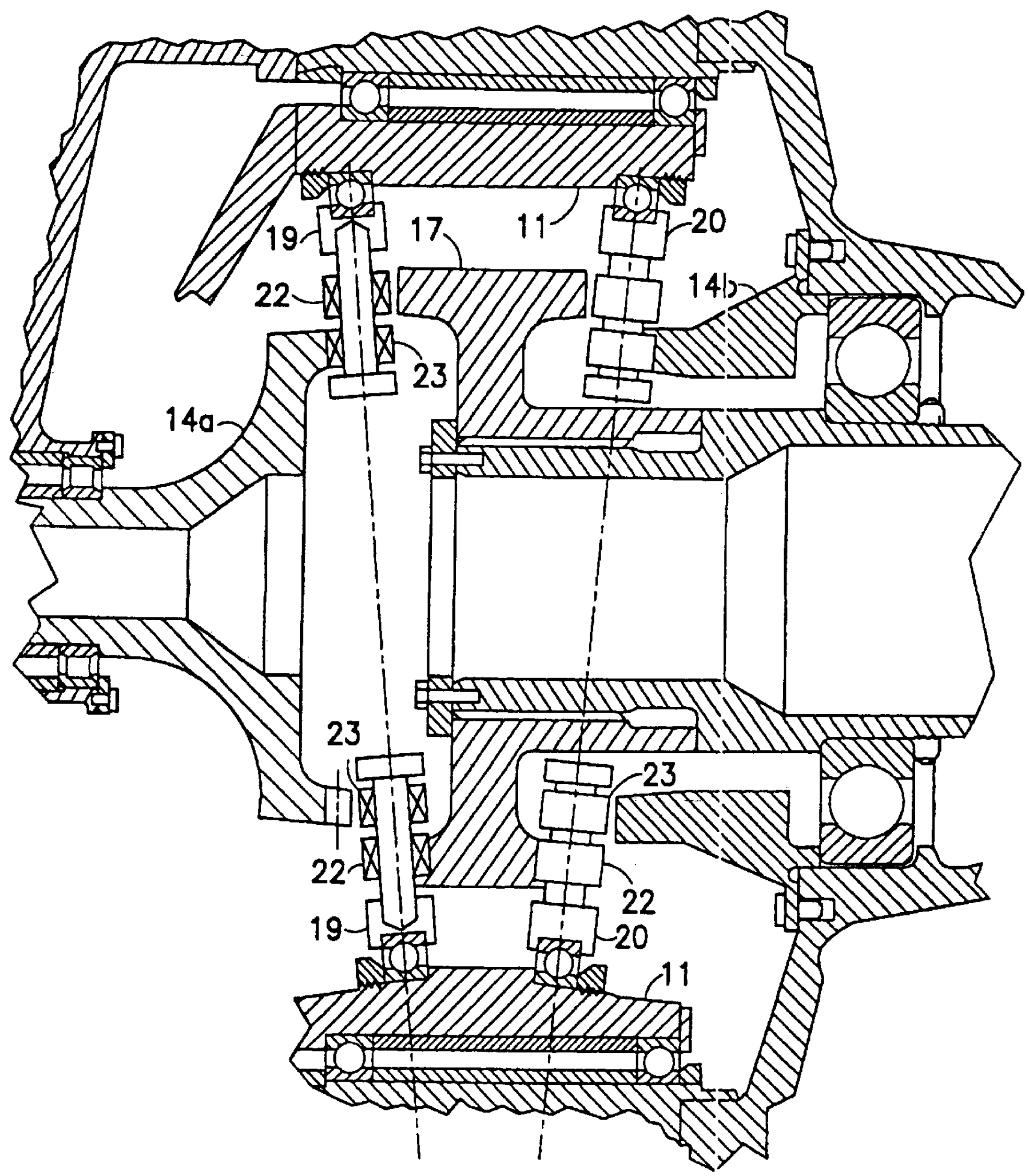
FIG. 3 is a side elevation view, in section, similar to FIG. 1, but illustrating this embodiment of the invention in greater detail, specifically showing multi-roller contacts occurring simultaneously at diametrically opposite quadrants of the invention.

Referring now to FIGS. 1, 2, and 3, there is shown by means of cross sectional views, one embodiment 10 of a variable power transmission incorporating features of the present invention. Although the variable power transmission concept of the invention will be described with reference to the embodiments shown in the drawings, it should be understood that the present invention can be embodied in many alternate forms or embodiments. In addition, any suitable size, shape or type of elements or materials could be used The variable speed power transmission 10 includes a rotatable split power pericyclic motion converter retaining ring member 11 journaled to the upper housing **15*a* that is attached to an input drive shaft 12 of a prime mover (not shown), via a bevel gear set 13 or face gear set (not shown), a rotatable coaxial reaction control rotor 14*a* connected to the lower stationary housing 15*b* via a pair of rolling element bearings 16*a* and 16*b*, a coaxial driving member 17 connected to the output shaft 18, and a stationary coaxial reaction member 14*b* connected to a stationary cover 15*c*. The pericyclic retaining ring member 11 embodies a set of two journaled concentric ring assemblies 19 and 20 with inner and outer rings separated by spoke pins 21 equally spaced such that each embodies an outer roller 22 and an inner roller 23. These two sets of pericyclic motion converter ring assemblies 19 and 20 that incorporate equally spaced spoke type pins 21 with outer rollers 22 and inner rollers 23, are journaled to the pericyclic motion converter retaining ring member 11** at a calculated design coning angle to achieve nutation motions.

In high load capacity and higher speed drive train systems, "split power" transmissions are typically designed to facilitate increased power density by providing a dual torque/load path from a prime mover to the output member (usually an output shaft) that drives the final system unit. Such a design is dimensionally more compact than conventional designs. The split power design configuration also provides an additional benefit to nutational types of transmissions by eliminating a pair of counter weights that would be necessary to eliminate dynamic imbalance caused by the nutational motion of the pericyclic motion converter due to its mounting arrangement, that is, at a design coning angle to the input shaft center line. Although the pericyclic motion converter is statically balanced, dynamic thrust forces develop due to moment loads created by the nutational motion. However, the split power design overcomes the dynamic imbalance via thrust force cancellation.

The two reaction members **14*a* and 14*b* are designed as circular faceplates that incorporate equally spaced individual conjugate convoluted type roller raceways 28*a* and 28*b* around their periphery to facilitate the reaction of contact forces during each pericyclic path of action of the two pericyclic motion converter ring assemblies 19 and 20. The driving member 17 is also designed as a circular faceplate with individual conjugate convoluted type roller raceways 30*a* and 30*b* (FIG. 2) around its periphery to achieve torque transmission at variable design speeds of the output shaft 18. The unique individual convoluted and enveloping conjugate roller raceways cams 28*a* and 28*b* and 30*a* and 30*b*, respectively, around the periphery of the reaction members 14*a* and 14*b* and the dual face cam driving member 17** are designed to kinematically and dynamically take advantage of the inherent high load capacity and efficiency of high precision rolling element bearings.

The flexible component arrangements of the present invention make it feasible to infinitely vary its speed ratio capability and make a selection of different individual speed ratios with the same components. This capability is made possible by changing the effective difference in angular raceway spacing (or angular positioning) between the driving and reaction members 17 and **14*a* and 14*b* via an actuator controller. The operation of the variable speed power transmission 10 is as follows: the input drive shaft 12 rotates the pericyclic motion converter retaining ring member 11 via a bevel gear set 13 to permit nutation or oscillatory type motion of the two pericyclic motion converter ring assemblies 19 and 20 via roller-raceway engagement with reaction control rotor members 14*a* and 14*b* and simultaneous roller-raceway engagement with the output driving member raceways 17 resulting in the conversion of nutation type motion to rotary motion of the output shaft 18. Different speed ratios at the output shaft 18 can be achieved by adjusting the rotational speed of the reaction control rotor member 14*a***.

It is envisioned that the oscillator arrangements in the pericyclic member 11 could be replaced by a single oscillator arrangement. It is envisioned that the principles of this invention can be employed in many devices, namely having an input member, a reaction member driven by the input member, a pericyclic member or oscillator member driven by the input member and a drive member driven by the pericyclic member, in which the rotation speed of the reaction member and or the pericyclic member can be controlled independent of the input member; thereby, allowing the speed reduction/increase at the drive member to vary. It is also envisioned that the drive member can rotate in a direction opposite of the input member and that the drive member can be placed in a coasting or neutral position so that there is not translation of energy from the input member.

Consider now the kinematics of the variable speed power transmission concept of the present invention. The split power pericyclic assembly 11 embodies a set of two journaled concentric ring units 19, 20 separated by a selected number of equally spaced spoke type pins 21 that each journal an outer roller 22 and inner roller 23. The two ring units 19, 20 are journaled to the rotatable pericyclic ring member 11 at a calculated design coning angle to facilitate oscillatory or wobble type motion of ring units 19, 20. The reaction member **14*a*, which is journaled to the housings, is designed as a circular face plate that incorporates a selected number of equally spaced conjugate convoluted roller raceways 28*a* around its periphery to facilitate the reaction of contact forces during each pericyclic path of action. The output driving rotor member 17 which is connected to the output shaft 18 is designed as a double circular faceplate with back to back convoluted type roller raceways 30*a*, 30*b* around its periphery to provide rotary torque transmission at design speeds of the output shaft 18. The stationary reaction member 14***b* which is attached to the housing is also designed as a circular face plate that incorporates a selected number of equally spaced conjugate convoluted roller raceways 28*b* around its periphery to facilitate the reaction of contact forces during each pericyclic path of action.

Rotation of the input shaft 12 causes oscillatory or wobble type motion of the journaled pericyclic ring units 19, 20 that embody outer rollers 22 and inner rollers 23. The pericyclic ring unit rollers simultaneously engage a full quadrant of the reaction members 14*a*, 14*b* and a full quadrant of the output driving rotor member 17. More specifically, the inner rollers 23 engage the reaction member 14*a* and the outer rollers 22 engage the output driving rotor 17. In this manner, the transmitted load is shared by fifty percent (two quadrants) of the rollers and the conjugate convoluted roller raceways 28*a*, 30*a* and 28*b*, 30*b* respectively as shown in FIG. 2. As a result of the unusual kinematic/kinetic features of the pericycler, the rotation of the input shaft 12 relative to the reaction members 14*a*, 14*b* causes a differential motion of the output driving rotor member, thereby permitting controlled variable speed without any significant power loss.

The geometry of the conjugate convoluted roller raceways 28*a*, 28*b* and 30*a*, 30*b* (FIG. 2) is determined from the path of motion of a fixed point on the pericycler ring units as the input shaft rotates the journaled split power pericyclic assembly member 11 and the rollers 22 and 23 engage the reaction members 14*a*, 14*b* thereby driving the output driving rotor member 17. One 360 degree rotation of the input shaft 12 results in one complete spherical pericyclic path of action. The following kinematic treatment determines the angular velocities of the input shaft 12 and the pericycler ring units and ultimately defines the conjugate convoluted roller raceways of the reaction members and the output driving rotor member 17.

Figure 4:
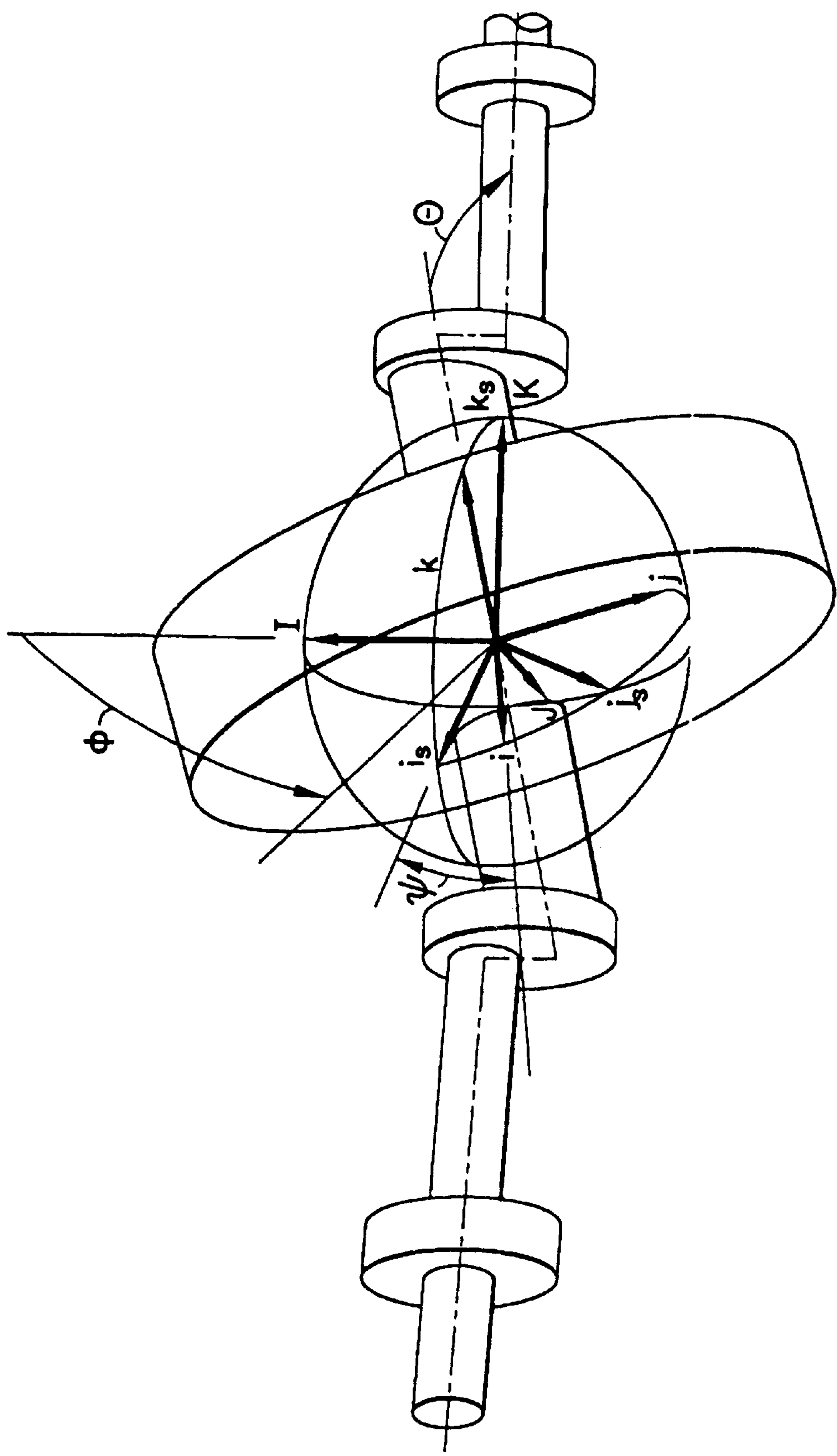
FIG. 4 is a diagrammatic view of a model for deriving pertinent information relating to the pericycler unit.

Three sets of right-handed orthogonal unit triads are shown in FIG. 4. FIG. 4 is a diagrammatic representation of a model for deriving the angular velocity of the pericycler and its position as a function of input shaft rotation to establish the path of a fixed point in the pericycler which defines the spherical path along which it moves during one raceway traverse on the reaction member. The coordinates for machining the reaction and output rotor face cams are also established from this model.

The triad $(\vec{I},\vec{J},\vec{K})$ is fixed in space and denotes the inertial frame while the triads $(\vec{i}_s,\vec{j}_s,\vec{k}_s)$ and $(\vec{i},\vec{j},\vec{k})$ are respectively fixed in the input shaft and pericycler. Transformation from one set of coordinates to the other is accomplished by defining the three conventional Euler angles (φ,φ,Ψ) [2]. The resulting orthogonal transformation matrix is:

$$[E(\phi,\theta,\psi)] = \begin{bmatrix} -\sin\phi\sin\psi + \cos\theta\cos\phi\cos\psi & \cos\phi\sin\psi + \cos\theta\sin\phi\cos\psi & -\sin\theta\cos\psi \\ -\sin\phi\cos\psi - \cos\theta\cos\phi\sin\psi & \cos\theta\cos\psi - \cos\theta\sin\phi\sin\psi & \sin\theta\sin\psi \\ \sin\theta\cos\phi & \sin\theta\sin\phi & \cos\theta \end{bmatrix} \quad (1)$$

and the relevant transformation is $$\vec{r}=[E(\phi,\theta,\Psi)]\vec{R} \quad (2)$$

where $\vec{R}$ is the vector in the fixed frame $(\vec{I},\vec{J},\vec{K})$ and $\vec{r}$ denotes the components in the moving system $(\vec{i},\vec{j},\vec{k})$.

In order to determine the path of a point fixed in the pericycler it is necessary to define angular velocity of the pericycler and represent this velocity in terms of φ,θ,Ψ, and their derivatives. Finally, the resulting equations may be integrated to obtain the pericycler position as a function of input shaft rotation. If the ratio of the number of convoluted raceways on the reaction members to the number of rollers on the pericycler is λ, then the angular velocity of the pericycler relative to the shaft in the shaft frame is clearly $$\vec{\omega}_{ns}{}^{s}=\lambda\omega_{reac.}\vec{k}_s$$

where $\omega_{reac.}$ is the angular velocity of the reaction members with respect to the shaft. When the reaction members are stationary and the shaft has an absolute angular velocity $\vec{\omega}_s \vec{K}$, then $$\vec{\omega}_{ns}{}^{s}=-\lambda\omega_s\vec{k}_s \quad (3)$$

Since the shaft frame is located by shaft rotation α and the pericycler angle γ, the above may be transformed in the inertial frame with φ=α, θ=γ, Ψ=0.

$$\vec{\omega}_{ns}=[E(\alpha,\gamma,0)]^T\vec{\omega}_{ns}{}^{s}=-\omega_s\lambda\sin\gamma\cos\alpha\vec{I}-\omega_s\gamma\sin\gamma\sin\alpha\vec{J}-\omega_s\lambda\cos\gamma\vec{K} \quad (4)$$

The absolute pericycler and shaft velocities are thus respectively written as $$\vec{\omega}=-\omega_s\lambda\sin\gamma\cos\alpha\vec{I}-\omega_s\lambda\sin\gamma\sin\alpha\vec{J}+\omega_s(1-\lambda\cos\gamma)\vec{K}\omega_s=\omega_s\vec{K} \quad (5)$$

In terms of φ,θ,Ψ, the angular velocity of the pericycler is expressed as $$\vec{\omega}_n=\phi\vec{K}+\theta\vec{j}_s+\Psi\vec{k} \quad (6)$$

where "·" denotes the time derivatives and the unit vectors $\vec{j}_s$ and $\vec{k}$ are expressible in terms of $(\vec{I},\vec{J},\vec{K})$ and (φ,θ,Ψ) as shown in FIG. 4. Some algebraic manipulation results in $$\begin{Bmatrix} \dot{\phi} \\ \dot{\theta} \\ \dot{\psi} \end{Bmatrix} = \begin{bmatrix} -\cos\phi\cot\theta & -\sin\phi\cot\theta & 1 \\ -\sin\phi & \cos\phi & 0 \\ \cos\phi\mathrm{cosec}\theta & \sin\phi\mathrm{cosec}\theta & 0 \end{bmatrix} \begin{Bmatrix} \omega_{n_1} \\ \omega_{n_2} \\ \omega_{n_3} \end{Bmatrix} \quad (7)$$

where the notation $\vec{\omega}_n=\omega_{n_1}\vec{I}+\omega_{n_2}\vec{J}+\omega_{n_3}\vec{K}$ is used.

If the shaft angular velocity $\omega_s\vec{K}$ is a constant, then Equations (5) and (7) may be combined to give the final expressions for φ,θ,Ψ in terms of shaft rotation α.

$$\frac{d\phi}{d\alpha} = \lambda\sin\gamma\cot\theta\cos(\alpha-\phi) - \lambda\cos\gamma + 1$$
$$\frac{d\partial}{d\alpha} = -\lambda\sin\gamma\sin(\alpha-\phi)$$
$$\frac{d\psi}{d\alpha} = -\lambda\sin\gamma\mathrm{cosec}\theta\cos(\alpha-\phi) \quad (8)$$

In general these equations may be integrated with the initial conditions α=0→φ=0, θ=γ, Ψ=0. However, since $\vec{\omega}^{s}_{ns}$ is along the unit vector $\vec{k}_s$ the pericycler vector $\vec{k}$ is fixed also in the shaft, which means that θ=γ, a constant, i.e., dθ/dα=0. A substitution of these conditions in Equation (8) gives $$\phi=\alpha$$
$$\theta=\gamma \quad (9)$$
$$\Psi==\lambda\alpha$$

As an application of the above analysis, let the point on the pericycler, under condition, have a position vector $\vec{r}$ in the pericycler frame $$\vec{r}=\cos\beta\,\vec{i}-\sin\beta\,\vec{k},$$

β being a coning angle.

It is clear that such a point will move on a sphere of unit radius and will be located by a position vector R in the inertial frame by the equation $$\vec{R}=[E(\alpha,\gamma,-\lambda\alpha)]^{T}\vec{r} \quad (10)$$

The components of $\vec{R}=R_1\vec{I}+R_2\vec{J}+R_3\vec{K}$ may be transformed into conventional longitudes and latitudes denoted respectively as $$\xi=-\tan^{-1}\left(\frac{R_2}{R_1}\right) \quad (11)$$
$$\eta=\tan^{-1}\left(\frac{R_3}{\sqrt{R_1^2+R_2^2}}\right)$$

Figure 5:
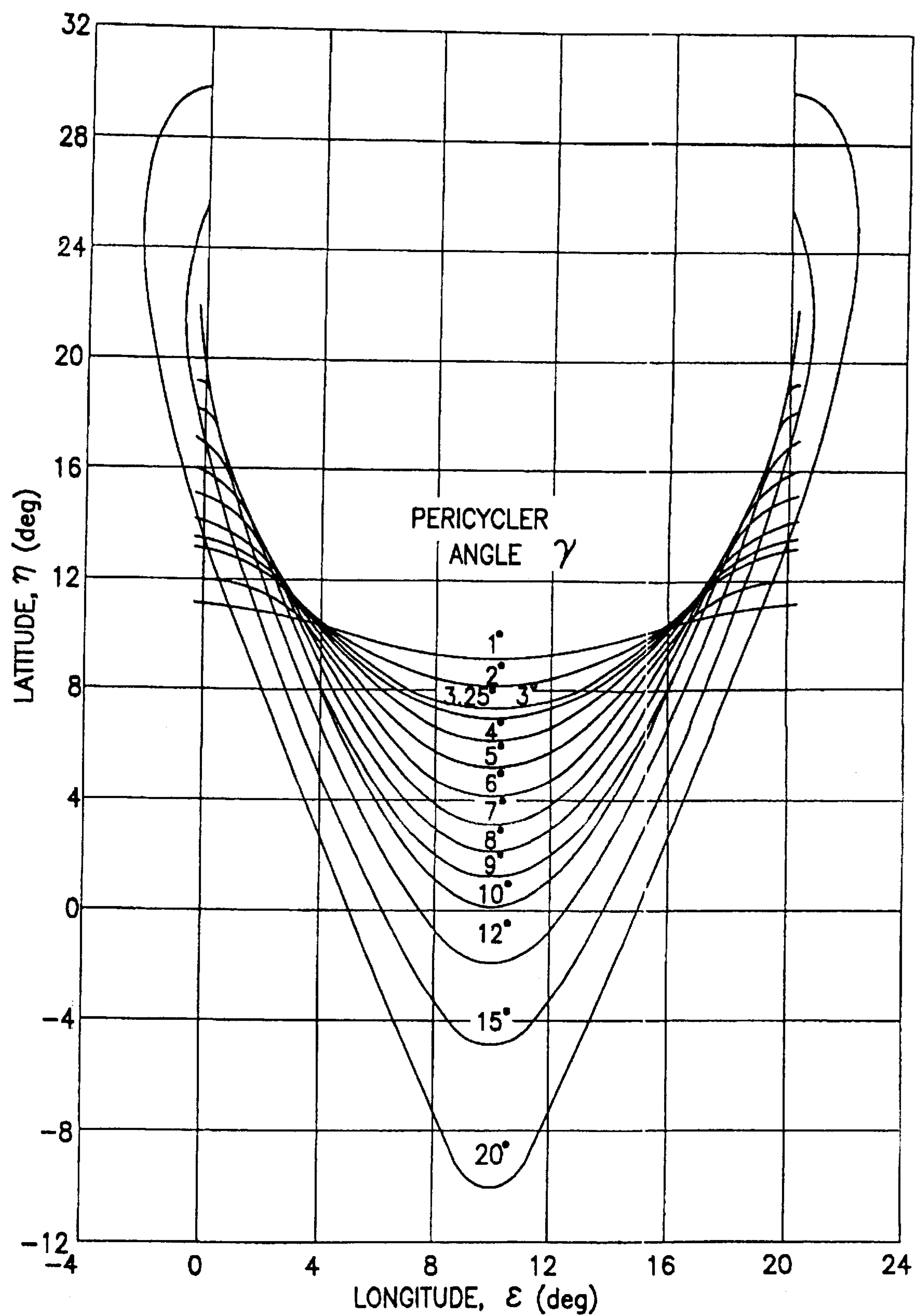
FIG. 5 is a graph depicting the path along which the center of a follower member of a pericyclic motion converter moves during a one revolution traverse while in engagement with the reaction control rotor as plotted for a plurality of values of pericyclic angle gamma.

For β=10° and λ=18/19, i.e., 18 raceways on the reaction members meshing with 19 rollers on the pericycler, ξ and η are plotted for various values of pericycler angle γ in FIG. 5. These profiles actually denote the path along which the center of a roller will move during one raceway traverse on the reaction members.

Figure 6:
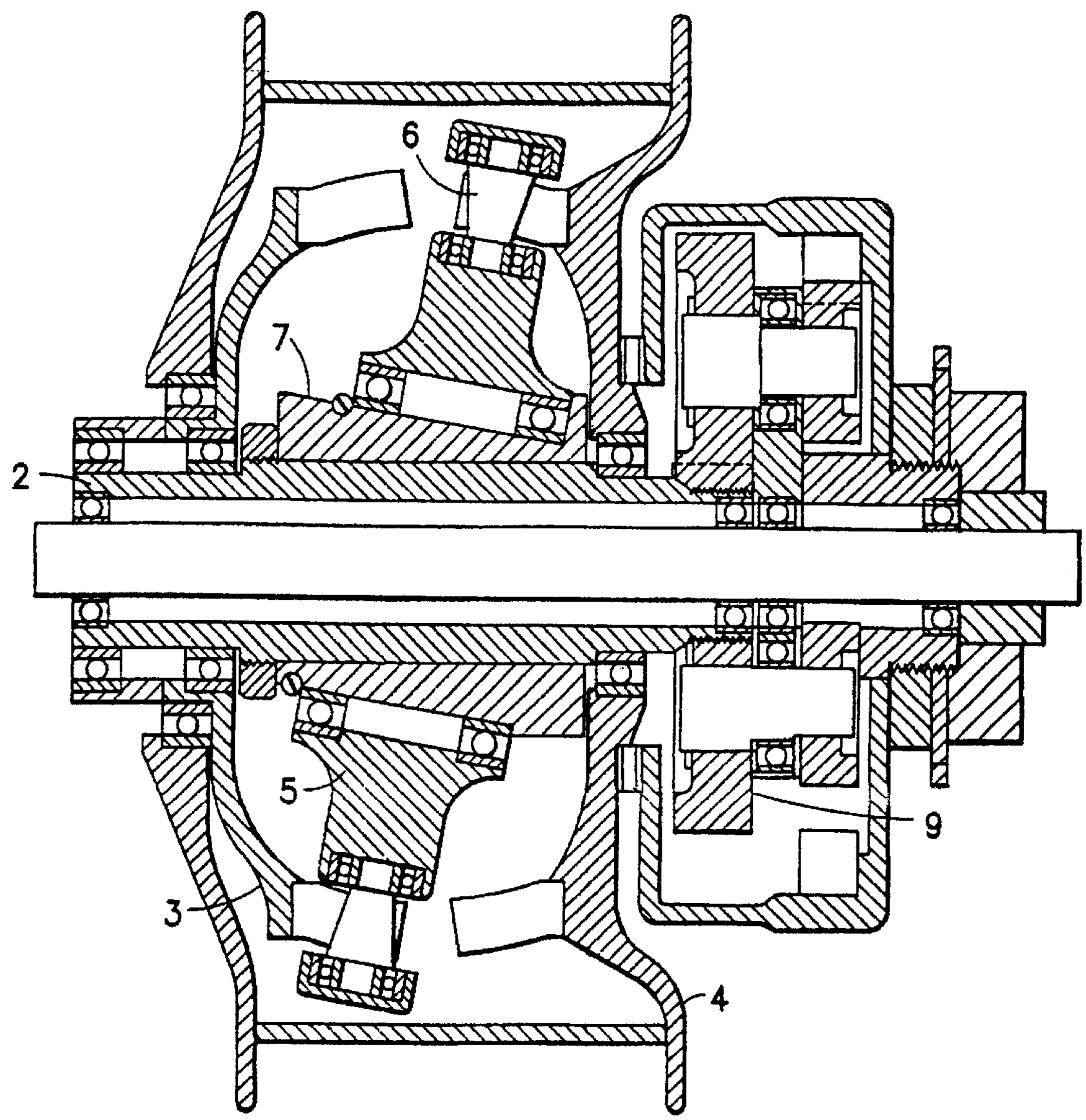
FIG. 6 is a cross sectional view in elevation of a prototype design of the present invention that is typical for mounting in a wheel hub of a vehicle.

A prototype design of the present invention, as seen in FIG. 6 has been fabricated and tested to verify its capability to function as a stepless variable speed transmission. This prototype PVT (Pericyclic Varydrive Transmission) is an example of its application to human powered vehicles including bicycles, scooters, wheel chairs, carts, etc. and for power-assisted human powered vehicles utilizing electric motors and control electronics to augment the user's effort. This prototype PVT can be mounted inside the hub of a bicycle rear wheel to facilitate stepless speed changes over a ratio range of about 0.535 to about 4.457. With such a construction, the PVT will likely eliminate the state-of-the-art derailleur/multi-sprocket system that permits only a relatively few step ratio speed changes.

The prototype PVT comprises a pericyclic member 5 journaled to the input shaft 2 at a designed angle 7 to permit oscillatory motion and thereby continuous torque transmitting engagement with a journaled reaction member 3 and simultaneously with an output driving member 4. For the bicycle application, the input speed is augmented, that is, increased, by a planetary gear set 9 having, for example, a 6:1 ratio. The pericycler member embodies a set of equally spaced rollers 6 that mesh with the convoluted type raceways of the reaction member 3 and the output driving member 4.

The output speed of the PVT can be varied by changing the reaction member 3 rotational speed with respect to the input shaft rpm. Maximum output speed is designed to decrease proportionately with increasing reaction member speed. The reaction member is counter rotating, that is, its rotation is in the opposite direction with respect to the input rotation.

To facilitate application in which the designs require low speed ratio ranges such as 0.5:1 to 5.6:1 which is typical for bicycles, an augmentation member is used to increase the basic input ratio to approximately 10:1. This provides an efficient rate of rotation of the reaction control rotor relative to the input member for a design variable speed output range of 0.5:1 to 5.6:1. The augmentation member can be a planetary gear or other in-line mechanical gear member.

The PVT design features that influence the output speed are as follows:

| | |
|---|---|
| Number of reaction member raceways, Nrm | 8 |
| Number of output driving member raceways, Nom | 10 |
| Number of pericyclic rollers, Npr | 8 |
| Planetary speed increase ratio, Rpl | 6:1 |

The reaction member speed ratio (Rpl) is defined as the ratio of reaction member speed rotation and the PVT input speed. The variable output speed ratio (V), (ratio of output speed to the input speed) is calculated by the following equations:

$$M=(Nom\times Npr)/(Nom\times Npr-Npr\times Nrm)$$

where M is the maximum PVT ratio of input to output with the reaction member fixed; and $$V=Rpl\times(1+Rm\times[M-1])/M.$$

Figure 7:
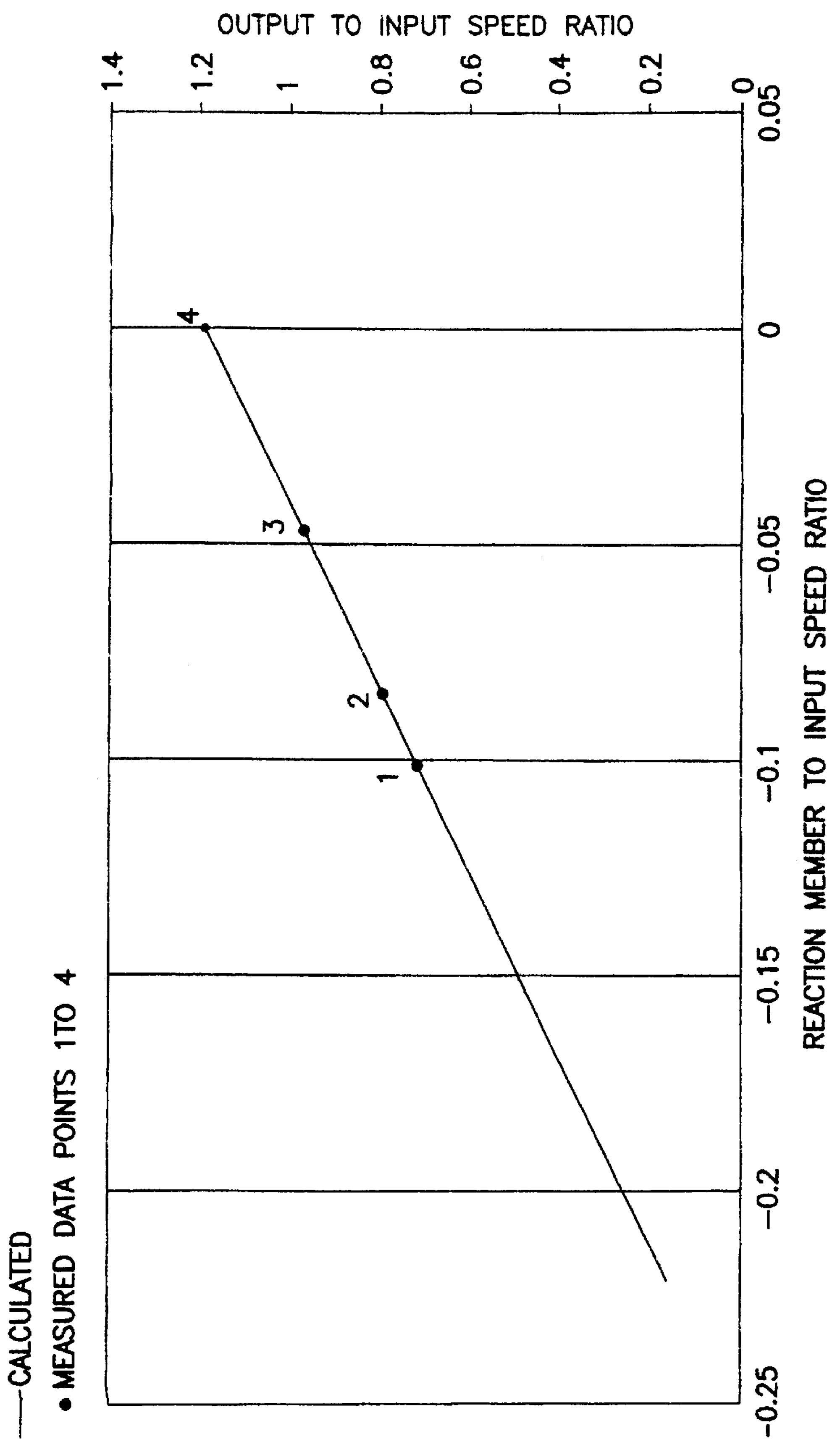
FIG. 7 is a graph of calculated, and four measured data points, of the output speed ratio V as a function of the reaction member speed ratio $R_{rm}$.

FIG. 7 is a graph of calculated output speed ratio V as a function of the reaction member speed ratio Rrm, and shows the linearly variable output speed capability of the prototype PVT unit.

The variable output speed capability of the prototype PVT unit was verified by measuring the rotational speeds of the input shaft 2, reaction member 3 and the output driving member 4. The component member speeds were measured by timing each member for a selected number of rotations (that is, by measuring the time required for 30 revolutions of the input shaft 2, 10 revolutions of the reaction member 3 and 60 revolutions of the output driving member 4. The reaction member 3 speed was increased progressively from zero up to a maximum speed that could be visually counted. Thus, various component rotational speeds were measured for four separate speed settings of the reaction member 3. At each of these speed settings, three measurements were made to minimize potential errors. Table 1 summarizes the measured times in seconds and rotational speeds in rpm for the respective components. Table 1 also shows the speed ratios of the reaction member (Rrm) and the overall output ratios for the respective measurements.

Table 2 compares the calculated and measured output ratios as a function of the ratios Rrm for the reaction member 3. As shown in FIG. 7, the measured data corresponds very closely with the calculated values of the output ratios for the speed settings of the four reaction members 3 evaluated.

TABLE 1

Measured Times and Speeds of PVT Input Member, Reaction Member, and Output Member

| | Input Member Speed | | Reaction Member Speed | | | Output Member Speed | | |
|---|---|---|---|---|---|---|---|---|
| | 30 Rev. Time | RPM | 10 Rev. Time | RPM | $R_{RM}$ Ration | 60 Rev. Time | RPM | Output |
| I. | 15.39 | 116.959 | — | 0 | 0.000 | 25.48 | 141.287 | 1.208 |
| | 15.34 | 117.340 | — | 0 | 0.000 | 25.60 | 140.625 | 1.198 |
| | 15.35 | 116.883 | — | 0 | 0.000 | 25.55 | 140.900 | 1.205 |
| II. | 15.69 | 114.723 | 18.55 | −32.345 | −0.047 | 32.37 | 111.214 | 0.969 |
| | 15.70 | 114.650 | 18.46 | −32.503 | −0.047 | 32.04 | 112.360 | 0.980 |
| | 15.56 | 115.681 | 18.64 | −32.189 | −0.046 | 31.85 | 113.030 | 0.977 |
| III. | 15.30 | 117.647 | 10.02 | −59.880 | −0.085 | 38.45 | 93.62 | 0.796 |
| | 15.35 | 117.264 | 9.96 | −60.241 | −0.086 | 38.28 | 94.044 | 0.802 |
| | 15.33 | 117.417 | 10.01 | −59.940 | −0.085 | 38.26 | 94.093 | 0.801 |
| IV. | 15.47 | 116.354 | 8.72 | −68.807 | −0.099 | 42.98 | 83.760 | 0.720 |
| | 15.38 | 117.035 | 8.30 | −72.289 | −0.103 | 42.98 | 83.760 | 0.716 |
| | 15.44 | 116.580 | 8.54 | −70.258 | −0.100 | 42.69 | 84.329 | 0.723 |

TABLE 2

Average Speed Ratios

| | Reaction Member $R_{RM}$ Ratio | Output to Input Ratio Calculated | Measured |
|---|---|---|---|
| I. | 0.000 | 1.200 | 1.204 |
| II. | −0.047 | 0.974 | 0.976 |
| III. | −0.085 | 0.792 | 0.800 |
| IV. | −0.101 | 0.715 | 0.714 |

Notes
1. $R_{rm}$ Ratio is the ratio of reaction member speed to the input speed.
2. Output ratio is the ratio of output speed to the input speed.

In conclusion the variable stepless output speed capability of the prototype PVT unit was verified. The output speed ratio varies linearly with increasing ratio Rrm for a reaction member 3 from a maximum output speed for a stationary (Rrm=0) reaction member 3. The output speed decreases linearly.

Turn now to FIGS. 8–17 for the description of another embodiment of the invention. In this instance, beginning with FIGS. 8–10, a continuously variable speed power transmission 200 includes an input member 202 in the form of longitudinally extending drive shaft 204 rotatable about an input axis 206. An output member 208 includes a longitudinally extending driven shaft 210 and an integral output disk 212 lying generally in a plane perpendicular to an output axis 214 about which driven shaft 210 rotates. The output disk 212 includes a solid web 213 which is splined or otherwise fixed to the driven shaft 210 and extends between a hub 216 fixed on the driven shaft and an outer peripheral flange 218 lying in a plane parallel to the output axis containing a plurality of rearwardly directed output face cams 220.

Figure 8:
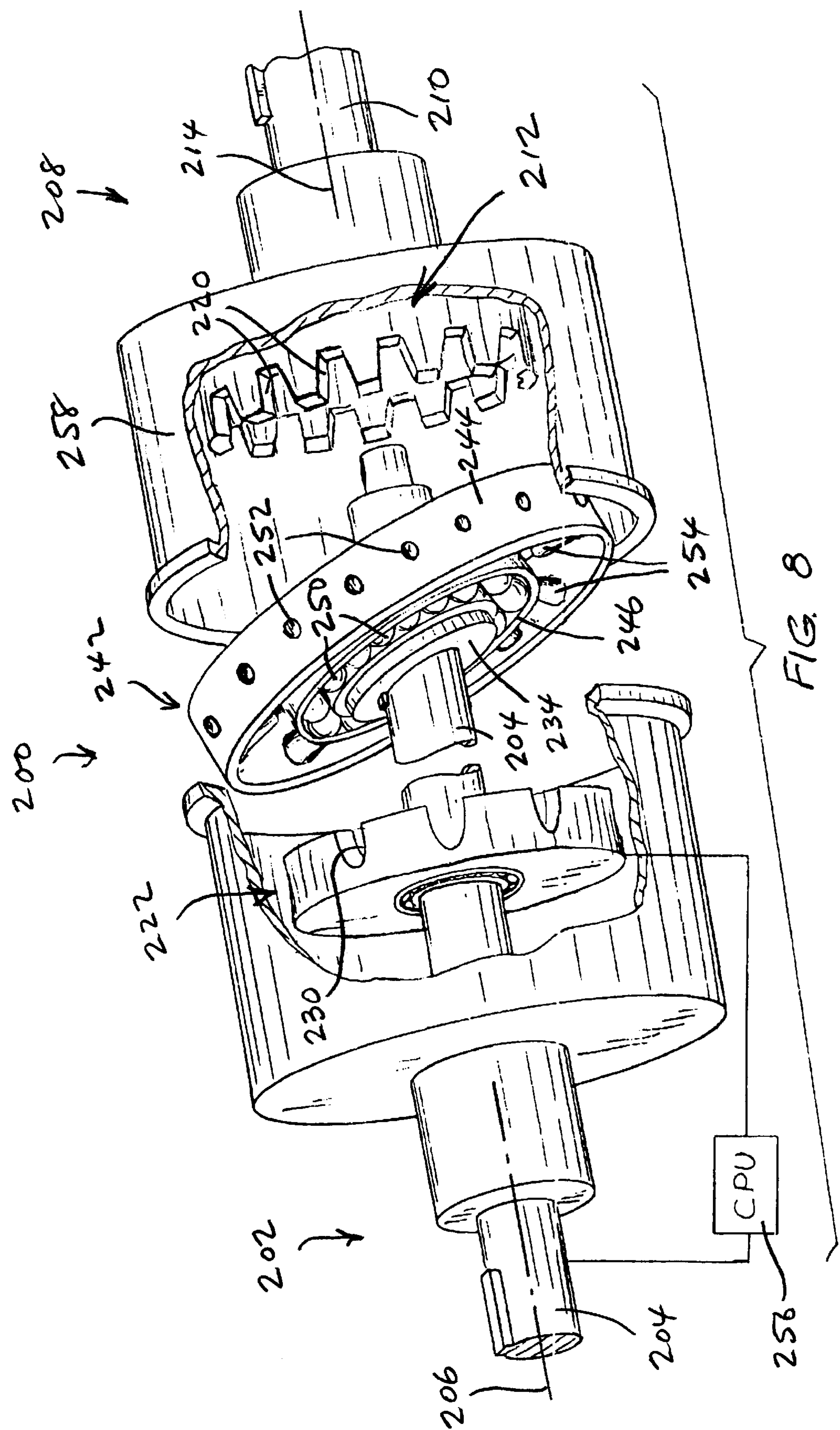
FIG. 8 is an exploded perspective view, partially cut away and shown in section, of another embodiment of the continuously variable power transmission of the present invention.
Figure 9:
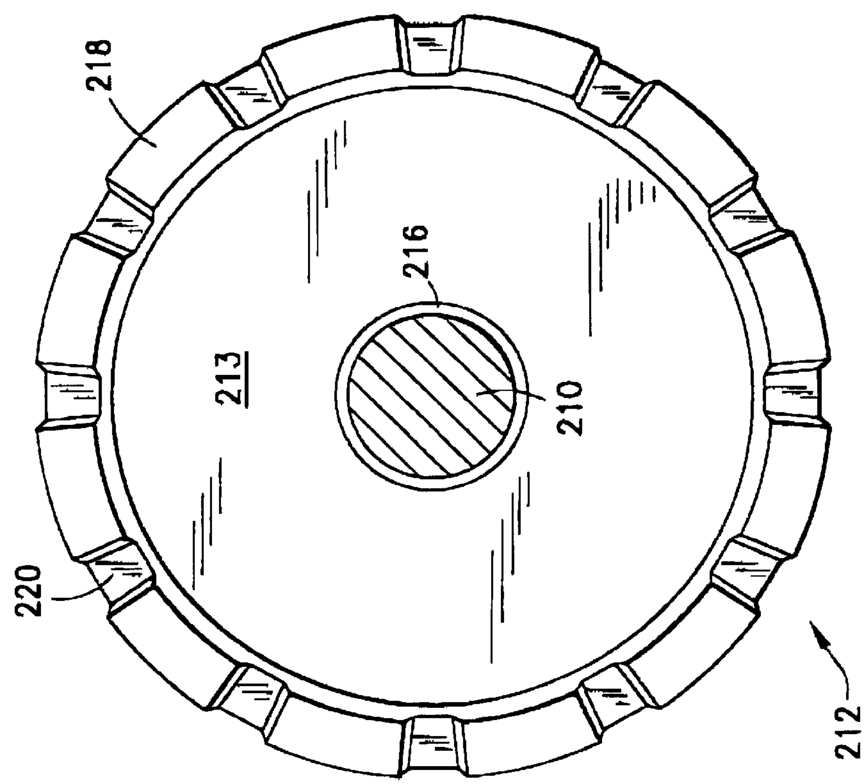
FIG. 9 is a detail elevation view illustrating an output disk which is a component of the power transmission illustrated in FIG. 8.
Figure 10:
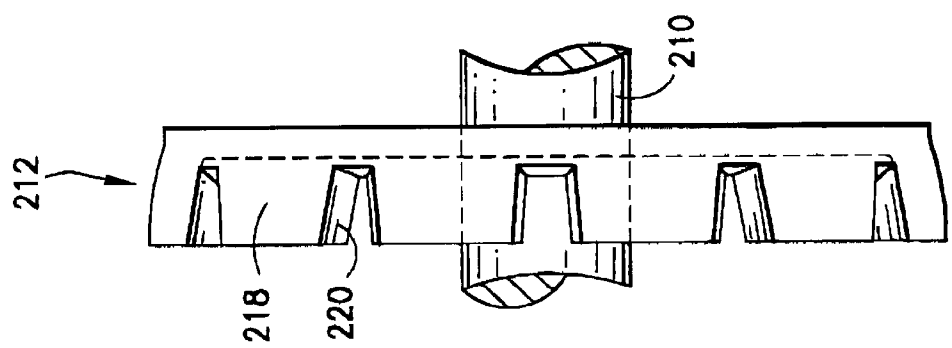
FIG. 10 is a detail side elevation view of the component illustrated in FIG. 9.
Figure 11:
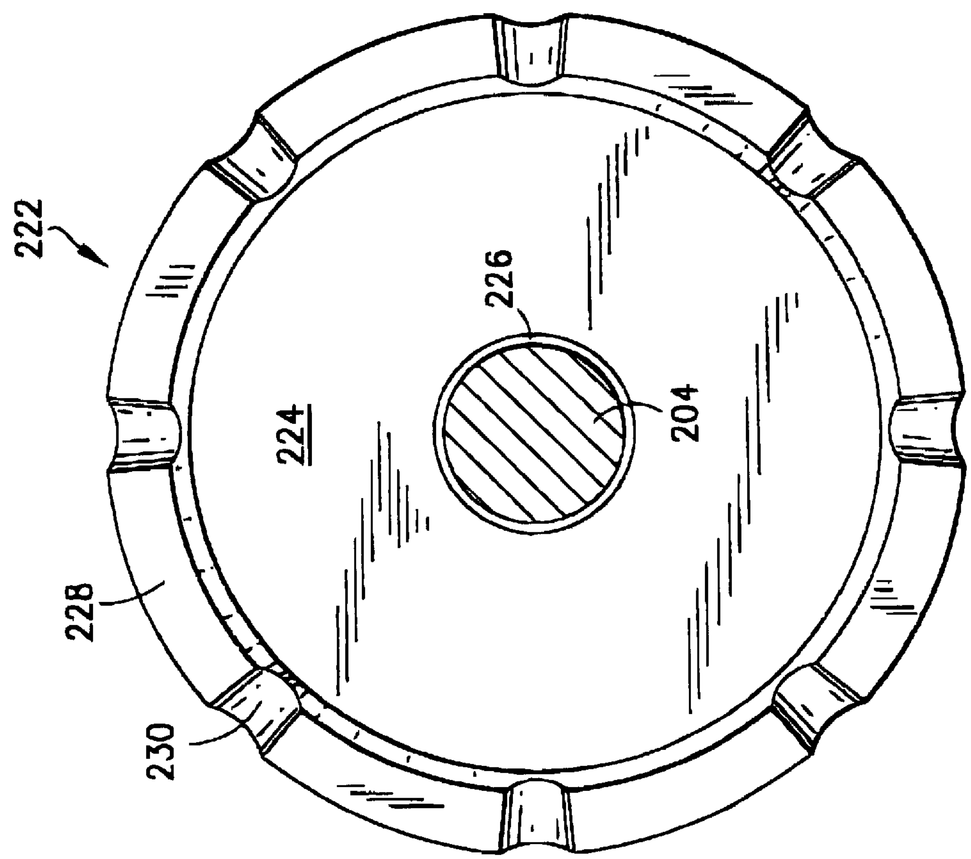
FIG. 11 is a detail elevation view illustrating a reaction control rotor which is a component of the power transmission illustrated in FIG. 8.
Figure 12:
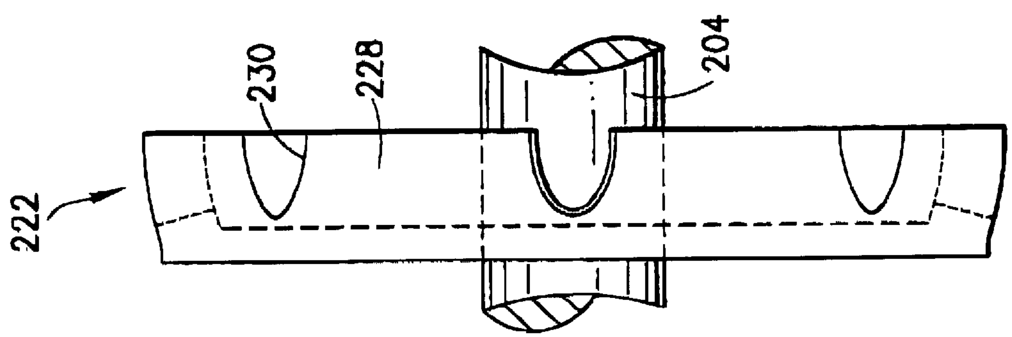
FIG. 12 is a detail side elevation view of the component illustrated in FIG. 11.

Viewing now FIGS. 8, 11, and 12, a reaction control rotor 222 is mounted for selective rotation about the input axis 206. The reaction control rotor 222 includes an input disk or web member 224 lying in a plane perpendicular to the input axis and extending between a hub 226 rotatably mounted on the drive shaft 204 and an outer peripheral flange 228 lying in a plane parallel to the input axis containing a plurality of forwardly directed reaction face cams 230 positioned in opposition to the output face cams 220 on the output member 208.

Figure 13:
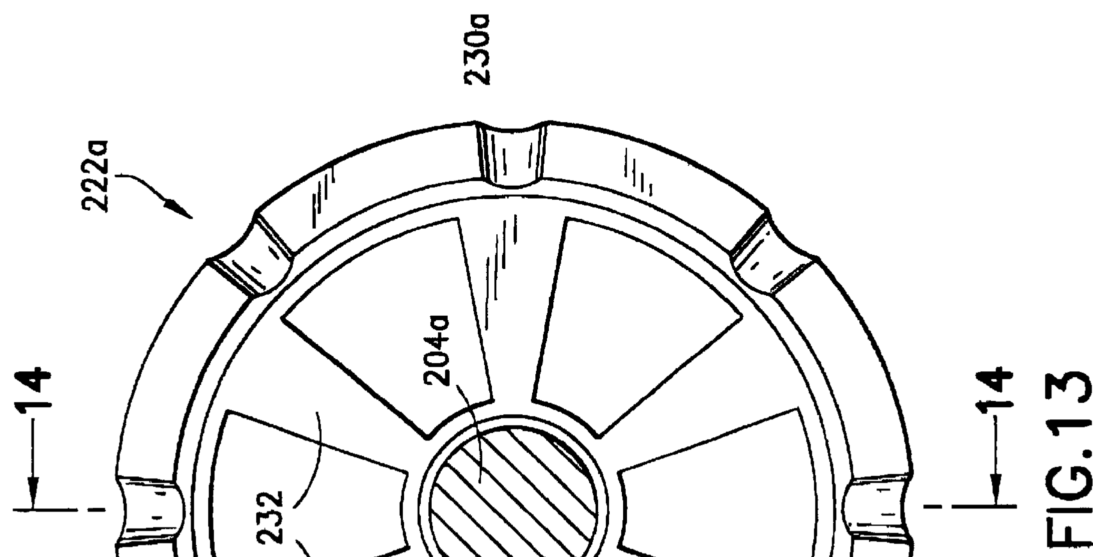
FIG. 13 is a detail elevation view illustrating a reaction control rotor which is a component of the power transmission illustrated in FIG. 8.
Figure 14:
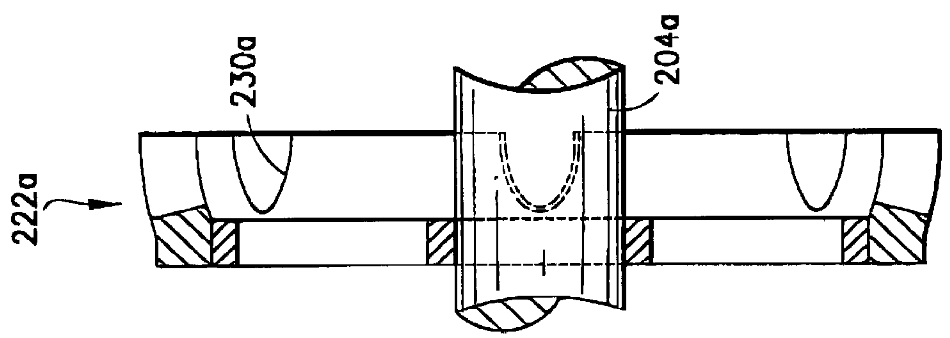
FIG. 14 is a detail side elevation view of the component illustrated in FIG. 13.

In a modified embodiment of the invention illustrated in FIGS. 13 and 14, a reaction control rotor **222*a* may include a hub 226*a* fixed on a driven shaft 204*a*, an outer peripheral flange 228*a* lying in a plane parallel to the output axis and containing a plurality of forwardly directed reaction face cams 230*a*, and a plurality of radially extending spokes 232 at circumferentially spaced locations extending between and integral with the hub 226*a* and with the outer peripheral flange. Although not illustrated, the output disk 212 may be similarly modified to include a plurality of radially directed spokes in place of the solid web member 213**.

Figures 15, 17:
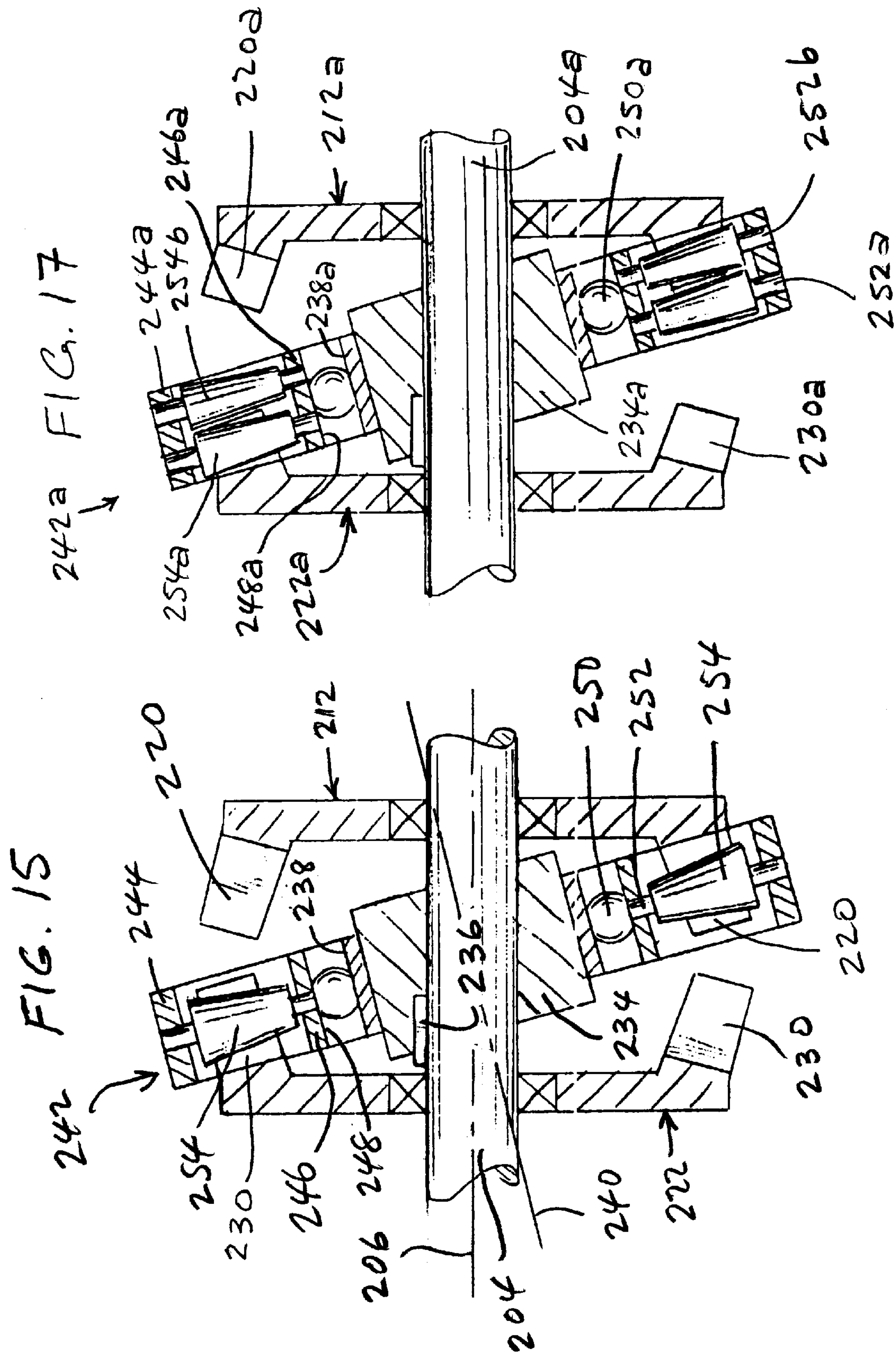
FIG. 15 is a detail elevation view, in section, of a pericyclic motion converter which is a component illustrated in FIG. 8.
FIG. 17 is a detail elevation view, in section, of a modified pericyclic motion converter which is a component illustrated in FIG. 16.

With continued reference to FIG. 8 and now turning also to FIG. 15, the input member 202 is seen to include the longitudinally extending drive shaft 204 and a canted cam member 234 fixed on the drive shaft as by a key member 236. The canted cam member 234 has a first bearing track 238 and a cam axis 240 coplanar with the input axis 206 but angularly disposed relative to the input axis. The power transmission 200 further includes a pericyclic motion converter 242 which itself includes a peripheral ring 244 coplanar and coaxial with the canted cam member 234 and an intermediate ring 246 coplanar and coaxial with the canted cam member and having a second bearing track 248 spaced from and opposed to the first bearing track. In a customary fashion, bearing elements 250 are suitably received between and are engaged with the first and second bearing tracks 238, 248 enabling rotation of the intermediate ring about the canted cam member.

A plurality of radially extending follower pins 252 are fixed at circumferentially spaced locations extending between and integral with the peripheral ring 244 and with the intermediate ring 246 and a load transmitting follower member 254 such as a roller is rotatably mounted on each of the follower pins. As clearly seen in FIG. 15, a plurality of the load transmitting follower members 254 simultaneously engage at diametrically opposite locations with the output face cams 220 and with the reaction face cams 230.

Suitable control apparatus in the form of a central processor unit 256 is an integral and necessary part of the invention and serves to selectively adjust the rate of rotation of the reaction control rotor 222 relative to the input member or drive shaft 204. In one instance, the reaction control rotor 222 may be fixed for unitary rotation with the drive shaft and in other instances may rotate through a desired range of rates of rotation relative to the input shaft. In those instances in which relative rotation occurs between the reaction control rotor 222 and the drive shaft 204, both rotation and nutation of the pericyclic motion converter 242 result about the input axis 206 and thereby cause a change of ratio of the rotational speed of the output member 208 relative to the input member 202.

In the instance of the power transmission 200, a housing 258 may be suitably mounted on the input member 202 and on the output member 208 and encompass the mechanism describe for its protection, but, unlike the instance of the embodiment FIGS. 1–3, no interaction occurs between the housing 258 and the assembly comprising the reaction control rotor 222, the output disk 212 and the pericyclic motion converter.

Figure 16:
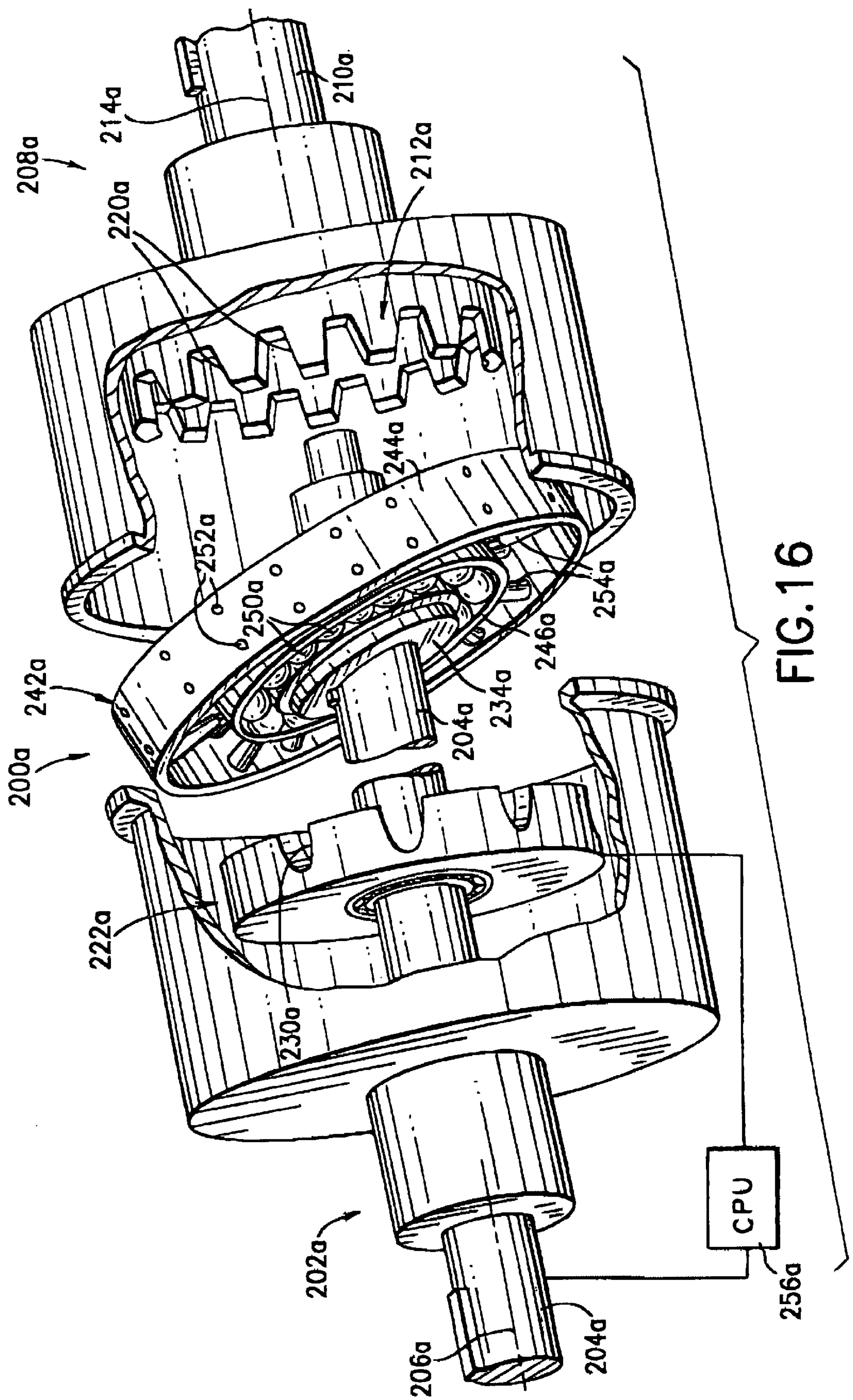
FIG. 16 is an exploded perspective view, partially cut away and shown in section, of still another embodiment of the continuously variable power transmission of the present invention.

Yet another embodiment of the invention can be seen with respect to FIGS. 16 and 17 which are generally similar to the construction of FIGS. 14 and 15. In this instance, similar components are similarly numbered but modified by use of the suffix "a". The modified variable speed transmission 200*a* differs from transmission 200 primarily in the provision of a pericyclic motion converter 242*a* which is of a moderately different construction than the pericyclic motion converter 242. More specifically, the pericyclic motion converter 242*a* includes a peripheral ring 244*a* coplanar and coaxial with the canted cam member 234*a* and an intermediate ring 246*a* coplanar and coaxial with the canted cam member. As in the earlier described embodiment, bearing elements 250*a* between and engaged with first and second bearing tracks 238*a*, 248*a* enable rotation of the intermediate ring about the canted cam member.

A first plurality of radially extending rearward follower pins 252*a* at circumferentially spaced locations extend between and are integral with the peripheral ring 244*a* and with the intermediate ring 246*a*, a load transmitting follower member 254*a* being rotatably mounted on each of the rearward follower pins. In a similar fashion, a second plurality of radially extending forward follower pins 252*b* at circumferentially spaced locations extend between and are integral with the peripheral ring 244*a* and with the intermediate ring 246*a*, a load transmitting follower member 254*b* being rotatably mounted on each of the forward follower pins 252*b*. The first plurality of rearward follower pins 252*a* and the second plurality of forward follower pins 252*b* lie, respectively, in spaced apart parallel planes. As clearly seen in FIG. 17, at any one time, a plurality of the load transmitting follower members 254*a* engage a number of the reaction face cams 230*a* along an arcuate reach of the reaction control rotor 222*a* even as a plurality of the load transmitting follower members 254*b* engage a number of the output face cams 220*a* along an arcuate reach of the output disk 212*a* at diametrically opposite locations of the pericyclic motion converter 242. In this manner, one set of the load transmitting follower members always rotate in one direction while the adjoining set always rotate in the opposite direction. Thus, the construction of FIGS. 16 and 17 avoids the shortcoming of the construction of FIGS. 14 and 15 which requires the follower members 254 to instantaneously change direction as they move out of engagement with the reaction face cams 230 and into engagement with the output face cams 220, and vice versa.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A continuously variable speed power transmission comprising:

an input member rotatable about an input axis including a longitudinally extending drive shaft and a canted cam member fixed on the drive shaft having a first bearing track and a cam axis coplanar with the input axis but angularly disposed relative to the input axis;

an output member rotatable about an output axis including a plurality of rearwardly directed output face cams thereon, the output member also including a longitudinally extending driven shaft, a hub fixed on the driven shaft, an outer peripheral rim lying in a plane perpendicular to the output axis and extending between an outer peripheral flange on the outer peripheral rim containing the plurality of rearwardly directed output face cams, and a plurality of radially extending spokes at circumferentially spaced locations extending between and integral with the hub and with the outer peripheral rim;

a reaction control rotor mounted for selective rotation about the input axis including a plurality of forwardly directed reaction face cams thereon in opposition to the output face cams on the output member, the reaction control rotor also including a hub rotatably mounted on the drive shaft, an outer peripheral rim lying in a plane perpendicular to the input axis and containing the plurality of forwardly directed reaction face cams, and a plurality of radially extending spokes at circumferentially spaced locations extending between and integral with the hub and with the outer peripheral rim;

a pericyclic motion converter rotatably mounted for nutational motion about the input axis including a plurality of load transmitting follower members thereon simultaneously engageable with the output face cams and with the reaction face cams, the pericyclic motion converter also including a peripheral ring coplanar and coaxial with the canted cam member, an intermediate ring coplanar and coaxial with the canted cam member and having a second bearing track spaced from and opposed to the first bearing track, bearing elements between and engaged with the first and second bearing tracks enabling rotation of the intermediate ring about the canted cam member, and a plurality of radially extending follower pins at circumferentially spaced locations extending between and integral with the peripheral ring and with the intermediate ring, a load transmitting follower member being rotatably mounted on each of the follower pins; and control means for selectively adjusting the rate of rotation of the reaction control rotor relative to the input member;

whereby relative rotation between the reaction control rotor and the input member results in both rotation and nutation of the pericyclic motion converter about the input axis and thereby results in a continuously variable change of ratio of the rotational speed of the output member relative to the input member.

2. A continuously variable speed power transmission as set forth in claim 1 wherein the plurality of load transmitting follower members includes first load transmitting follower members engageable with the output face cams and second load transmitting follower members engageable with the reaction face cams.

3. A continuously variable speed power transmission comprising:

a housing;

an input member rotatable about an input axis;

an output member rotatable about an output axis including a plurality of rearwardly directed output face cams thereon;

a reaction control rotor mounted on the housing for selective rotation about the input axis including a plurality of forwardly directed reaction face cams thereon in opposition to the rearwardly directed output face cams on the output member;

a pericyclic motion converter rotatably mounted on the input member for nutational motion about the input axis including a plurality of load transmitting follower members thereon simultaneously engageable with the output face cams and with the reaction face cams; and control means for selectively adjusting the rate of rotation of the reaction control rotor relative to the input member;

wherein the load transmitting members of the pericyclic motion converter kinematically under pure rolling contact traverse a mathematically higher order spherical path of action during each revolution of the input member;

whereby relative rotation between the reaction control rotor and the input member results in both rotation and nutation of the pericyclic motion converter about the input axis and thereby results in a continuously variable change of rotational speed of the output member relative to the input member.

4. A continuously variable speed power transmission as set forth in claim 3 wherein the input member includes a longitudinally extending drive ring;

wherein the reaction control rotor includes an input disk lying in a plane perpendicular to the input axis and extending between a hub rotatably mounted on the housing and an outer peripheral flange containing the plurality of forwardly directed reaction face cams; and wherein the output member includes a longitudinally extending driven shaft and an integral output disk lying in a plane perpendicular to the output axis and extending between a hub fixed on the driven shaft and an outer peripheral flange containing the plurality of rearwardly directed output face cams.

5. A continuously variable speed power transmission as set forth in claim 4 wherein the drive ring and the driven shaft are axially aligned.

6. A continuously variable speed power transmission as set forth in claim 3 wherein the input member includes a longitudinally extending drive ring;

wherein the reaction control rotor includes a hub rotatably mounted on the housing, a web member lying in a plane perpendicular to the input axis and a peripheral flange containing the plurality of forwardly directed reaction face cams, and a web member extending between and integral with the hub and with the peripheral rim; and wherein the output member includes a longitudinally extending driven shaft, a hub fixed on the driven shaft, an outer peripheral flange containing the plurality of rearwardly directed output face cams, and a web member extending between and integral with the hub and with the outer peripheral flange.

7. A continuously variable speed power transmission as set forth in claim 6 wherein the drive ring and the driven shaft are axially aligned.

8. A continuously variable speed power transmission as set forth in claim 3 wherein the input member includes a longitudinally extending drive ring having an inner annular surface and an outer annular surface;

first bearing elements between the outer annular surface of the drive ring and the housing enabling rotation of the drive ring about the input axis; and wherein the pericyclic motion converter includes:

a peripheral ring coaxial with the input axis and lying in a plane canted relative to the input axis; and second bearing elements between the peripheral ring and the inner annular surface of the drive ring;

an intermediate ring coplanar and coaxial with the peripheral ring spaced therefrom; and a plurality of radially extending follower pins at circumferentially spaced locations extending between and integral with the peripheral ring and with the intermediate ring, a load transmitting follower member being rotatably mounted on each of the follower pins.

9. A continuously variable speed power transmission as set forth in claim 8 wherein the plurality of radially extending follower pins includes a first set of follower members lying in a circle located at a first radius distant from the input axis and a second set of follower members lying in a circle located at a second radius distant from the input axis; and wherein the forwardly directed reaction face cams lie in a circle located at the first radius distant from the input axis; and wherein the rearwardly directed output face cams lie in a circle located at the second radius distant from the input axis.

10. A continuously variable speed power transmission as set forth in claim 3 wherein the input member includes a longitudinally extending drive ring having an inner annular surface and an outer annular surface; including:

first bearing elements between the outer annular surface of the drive ring and the housing enabling rotation of the drive ring about the input axis; and a fixed reaction control rotor mounted on the housing including a plurality of rearwardly directed reaction face cams;

wherein the output member includes a plurality of forwardly directed output face cams thereon in opposition to the rearwardly directed reaction face cams on the fixed reaction control rotor;

wherein the pericyclic motion converter includes:

a first peripheral ring coaxial with the input axis and lying in a plane canted relative to the input axis;

a first intermediate ring coplanar and coaxial with the first peripheral ring and radially spaced therefrom;

a plurality of radially extending first follower pins at circumferentially spaced locations extending between and integral with the first peripheral ring and with the first intermediate ring, a first load transmitting follower member being rotatably mounted on each of the first follower pins;

a second peripheral ring coaxial with the input axis and lying in a plane canted relative to the input axis;

a second intermediate ring coplanar and coaxial with the second peripheral ring and radially spaced therefrom; and a plurality of radially extending second follower pins at circumferentially spaced locations extending between and integral with the second peripheral ring and with the second intermediate ring, a load transmitting follower member being rotatably mounted on each of the second follower pins;

wherein the plane of the first peripheral ring and first intermediate ring is angularly disposed relative to the plane of the second peripheral ring and second intermediate ring;

such that first load transmitting follower members are engaged with the forwardly directed reaction face cams as diametrically opposed first load transmitting follower members are engaged with the rearwardly directed output face cams on the output member; and such that, simultaneously, second load transmitting follower members are engaged with the rearwardly directed output face cams on the output member as diametrically opposed second load transmitting follower members are engaged with the forwardly directed reaction face cams on the first reaction control rotor.

11. A continuously variable speed power transmission as set forth in claim 10 including:

a first set of the follower members lying in a circle located at a first radius distant from the input axis and a second set of the follower members lying in a circle located at a second radius distant from the input axis; and wherein the forwardly directed reaction face cams lie in a circle located at the first radius distant from the input axis; and wherein the rearwardly directed output face cams lie in a circle located at the second radius distant from the input axis; and a third set of the follower members lying in a circle located at a first radius distant from the input axis and a fourth set of the follower members lying in a circle located at a second radius distant from the input axis; and wherein the forwardly directed reaction face cams lie in a circle located at the second radius distant from the input axis; and wherein the rearwardly directed output face cams lie in a circle located at the first radius distant from the input axis.

12. A continuously variable speed power transmission comprising:

an input member rotatable about an input axis including a longitudinally extending drive shaft and a canted cam member fixed on the drive shaft having a first bearing track and a cam axis coplanar with the input axis but angularly disposed relative to the input axis;

an output member rotatable about an output axis including a plurality of rearwardly directed output face cams thereon;

a reaction control rotor mounted for selective rotation about the input axis including a plurality of forwardly directed reaction face cams thereon in opposition to the output face cams on the output member;

a pericyclic motion converter rotatably mounted for nutational motion about the input axis including a plurality of load transmitting follower members thereon simultaneously engageable with the output face cams and with the reaction face cams, the pericyclic motion converter also including a peripheral ring coplanar and coaxial with the canted cam member, an intermediate ring coplanar and coaxial with the canted cam member and having a second bearing track spaced from and opposed to the first bearing track, bearing elements between and engaged with the first and second bearing tracks enabling rotation of the intermediate ring about the canted cam member, a first plurality of radially extending rearward follower pins at circumferentially spaced locations extending between and integral with the peripheral ring and with the intermediate ring, a load transmitting follower member being rotatably mounted on each of the rearward follower pins, and a second plurality of radially extending forward follower pins at circumferentially spaced locations extending between and integral with the peripheral ring and with the intermediate ring, a load transmitting follower member being rotatably mounted on each of the forward follower pins, the first plurality of rearward follower pins and the second plurality of forward follower pins lying respectively in spaced apart parallel planes; and control means for selectively adjusting the rate of rotation of the reaction control rotor relative to the input member;

whereby relative rotation between the reaction control rotor and the input member results in both rotation and nutation of the pericyclic motion converter about the input axis and thereby results in a continuously variable change of ratio of the rotational speed of the output member relative to the input member.

13. A continuously variable speed power transmission as set forth in claim 12 wherein the reaction control rotor includes a hub rotatably mounted on the drive shaft, an outer peripheral rim lying in a plane perpendicular to the input axis and containing the plurality of forwardly directed reaction face cams, and a plurality of radially extending spokes at circumferentially spaced locations extending between and integral with the hub and with the outer peripheral rim; and wherein the output member includes a longitudinally extending driven shaft, a hub fixed on the driven shaft, an outer peripheral rim lying in a plane perpendicular to the output axis and extending between an outer peripheral flange on the outer peripheral rim containing the plurality of rearwardly directed output face cams, and a plurality of radially extending spokes at circumferentially spaced locations extending between and integral with the hub and with the outer peripheral rim.

14. A continuously variable speed power transmission comprising:

an input member rotatable about an input axis including a longitudinally extending drive shaft and a canted cam member fixed on the drive shaft having a first bearing track and a cam axis coplanar with the input axis but angularly disposed relative to the input axis;

an output member rotatable about an output axis including a plurality of rearwardly directed output face cams thereon;

a reaction control rotor mounted for selective rotation about the input axis including a plurality of forwardly directed reaction face cams thereon in opposition to the output face cams on the output member;

a pericyclic motion converter rotatably mounted for nutational motion about the input axis including a plurality of load transmitting follower members thereon simultaneously engageable with the output face cams and with the reaction face cams, the pericyclic motion converter including a peripheral ring coplanar and coaxial with the canted cam member, an intermediate ring coplanar and coaxial with the canted cam member and having a second bearing track spaced from and opposed to the first bearing track, bearing elements between and engaged with the first and second bearing tracks enabling rotation of the intermediate ring about the canted cam member, a plurality of radially extending first follower pins at circumferentially spaced locations extending between and integral with the peripheral ring and with the intermediate ring, a first load transmitting follower member being rotatably mounted on each of the first follower pins and engageable with the output face cams, and a plurality of radially extending second follower pins at circumferentially spaced locations extending between and integral with the peripheral ring and with the intermediate ring, a second load transmitting follower member being rotatably mounted on each of the second follower pins and engageable with the reaction face cams, the second follower pins lying generally in a plane parallel to and spaced from the first follower pins; and control means for selectively adjusting the rate of rotation of the reaction control rotor relative to the input member;

whereby relative rotation between the reaction control rotor and the input member results in both rotation and nutation of the pericyclic motion converter about the input axis and thereby results in a continuously variable change of ratio of the rotational speed of the output member relative to the input member.

15. A continuously variable speed power transmission comprising:

an input member rotatable about an input axis;

an output member rotatable about an output axis including a plurality of rearwardly directed output face cams thereon;

a reaction control rotor mounted for selective rotation about the input axis including a plurality of forwardly directed reaction face cams thereon in opposition to the output face cams on the output member;

a pericyclic motion converter rotatably mounted for nutational motion about the input axis including a plurality of load transmitting follower members thereon simultaneously engageable with the output face cams and with the reaction face cams; and control means for selectively adjusting the rate of rotation of the reaction control rotor relative to the input member;

wherein the load transmitting members of the pericyclic motion converter kinematically under pure rolling contact traverse a mathematically higher order spherical path of action during each revolution of the input member;

whereby relative rotation between the reaction control rotor and the input member results in both rotation and nutation of the pericyclic motion converter about the input axis and thereby results in a continuously variable change of ratio of the rotational speed of the output member relative to the input member.

16. A continuously variable speed power transmission as set forth in claim 15 wherein the input member includes a longitudinally extending drive shaft;

wherein the reaction control rotor includes an input disk lying in a plane perpendicular to the input axis and extending between a hub rotatably mounted on the drive shaft and an outer peripheral flange containing the plurality of forwardly directed reaction face cams; and wherein the output member includes a longitudinally extending driven shaft and an integral output disk lying in a plane perpendicular to the output axis and extending between a hub fixed on the driven shaft and an outer peripheral flange containing the plurality of rearwardly directed output face cams.

17. A continuously variable speed power transmission as set forth in claim 16 wherein the drive shaft and the driven shaft are axially aligned.

18. A continuously variable speed power transmission as set forth in claim 15 wherein the input member includes a longitudinally extending drive shaft;

wherein the reaction control rotor includes a hub rotatably mounted on the drive shaft, a web member lying in a plane perpendicular to the input axis and a peripheral flange containing the plurality of forwardly directed reaction face cams, and a plurality of radially extending spokes at circumferentially spaced locations extending between and integral with the hub and with the peripheral rim; and wherein the output member includes a longitudinally extending driven shaft, a hub fixed on the driven shaft, an outer peripheral flange containing the plurality of rearwardly directed output face cams, and a plurality of radially extending spokes at circumferentially spaced locations extending between and integral with the hub and with the outer peripheral flange.

19. A continuously variable speed power transmission as set forth in claim 18 wherein the drive shaft and the driven shaft are axially aligned.

20. A continuously variable speed power transmission as set forth in claim 15 wherein the input member includes a longitudinally extending drive shaft and a canted cam member fixed on the drive shaft having a first bearing track and a cam axis coplanar with the input axis but angularly disposed relative to the input axis; and wherein the pericyclic motion converter includes:

a peripheral ring coplanar and coaxial with the canted cam member; an intermediate ring coplanar and coaxial with the canted cam member and having a second bearing track spaced from and opposed to the first bearing track;

bearing elements between and engaged with the first and second bearing tracks enabling rotation of the intermediate ring about the canted cam member; and a plurality of radially extending follower pins at circumferentially spaced locations extending between and integral with the peripheral ring and with the intermediate ring, a load transmitting follower member being rotatably mounted on each of the follower pins.

* * * * *